United States Patent
Okabe et al.

(10) Patent No.: US 7,258,186 B2
(45) Date of Patent: Aug. 21, 2007

(54) VEHICLE BODY FRAME OF MOTORCYCLES

(75) Inventors: Yasuhisa Okabe, Akashi (JP); Nobumasa Taniguchi, Ono (JP); Ryo Iwata, Akashi (JP); Takeshi Moritomo, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 117 days.

(21) Appl. No.: 10/524,471

(22) PCT Filed: Aug. 1, 2003

(86) PCT No.: PCT/JP03/09839

§ 371 (c)(1),
(2), (4) Date: Feb. 14, 2005

(87) PCT Pub. No.: WO2004/020271

PCT Pub. Date: Mar. 11, 2004

(65) Prior Publication Data

US 2005/0263334 A1  Dec. 1, 2005

(30) Foreign Application Priority Data

Aug. 30, 2002  (JP) .............................. 2002-254990

(51) Int. Cl.
*B62D 61/02* (2006.01)
*B62K 11/00* (2006.01)
*B62M 7/00* (2006.01)

(52) U.S. Cl. ................. 180/219; 180/220; 180/229
(58) Field of Classification Search ............ 180/219, 180/220, 225, 229
See application file for complete search history.

(56) References Cited

U.S. PATENT DOCUMENTS

| 4,597,466 A | * | 7/1986 | Yamada .................. 180/225 |
| 4,611,679 A | * | 9/1986 | Yanagishita et al. ....... 180/68.3 |
| 4,637,486 A | * | 1/1987 | Iwai ...................... 180/225 |
| 4,648,474 A | * | 3/1987 | Shinozaki et al. .......... 180/219 |
| 4,722,412 A | * | 2/1988 | Takemura et al. .......... 180/229 |
| 5,952,109 A |   | 9/1999 | Nagami et al. |
| 6,409,783 B1 | * | 6/2002 | Miyajima et al. .......... 55/385.3 |

FOREIGN PATENT DOCUMENTS

| JP | 63-98889 | 6/1988 |
| JP | 63-166884 | 10/1988 |

(Continued)

*Primary Examiner*—Lesley D. Morris
*Assistant Examiner*—Marc A. Scharich

(57) ABSTRACT

There is provided a vehicle frame structure for a motorcycle having an appealing appearance, which structure can be assembled lightweight and compact in size and at a reduced cost. The vehicle frame structure includes a head block (2) including a head tube (3), a main frame (11) forked leftwards and rightwards from the head block (2) to form a pair of main frame half portions (11*a*, 11*b*) extending rearwardly thereof, and swing arm brackets (8) extending downwardly from rear ends of the main frame half portions (11*a*, 11*b*). An inner frame portion (21) of the main frame (11) and the swing arm brackets (8) in their entirety or respective inner portions of the swing arm brackets (8) are integrally formed by an inner member (19) prepared from a metal casting, and at least an outer frame portion of the main frame (11) is formed by an outer member (20) prepared from a sheet metal.

7 Claims, 4 Drawing Sheets

FOREIGN PATENT DOCUMENTS

| | | |
|---|---|---|
| JP | 0 322 305 A2 | 12/1988 |
| JP | 01-237276 | 9/1989 |
| JP | 7-44537 | 11/1995 |
| JP | 09-206979 | 8/1997 |
| JP | 2688916 | 8/1997 |
| JP | 10-35559 | 2/1998 |
| JP | 2000-345558 | 12/2000 |

* cited by examiner

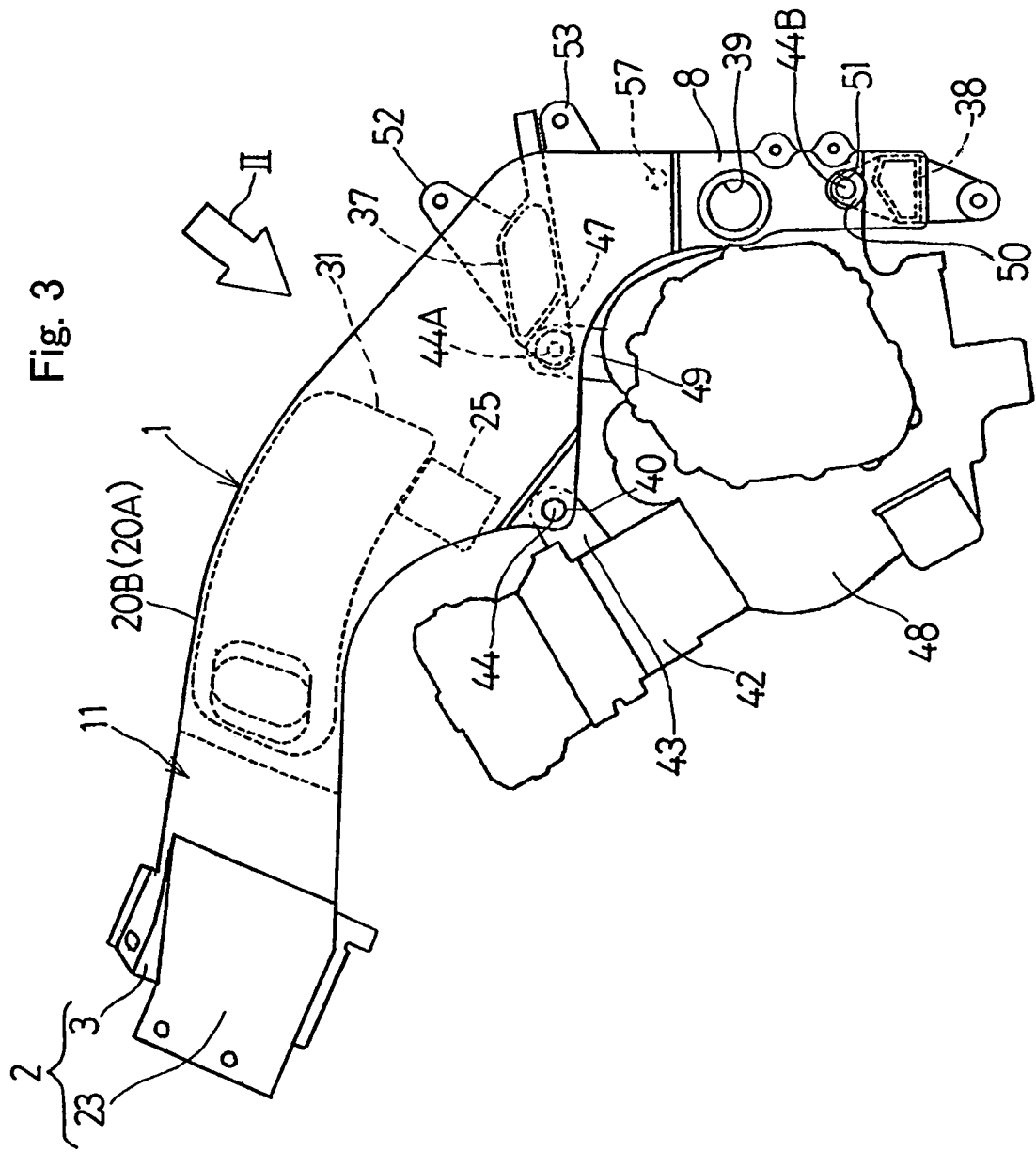

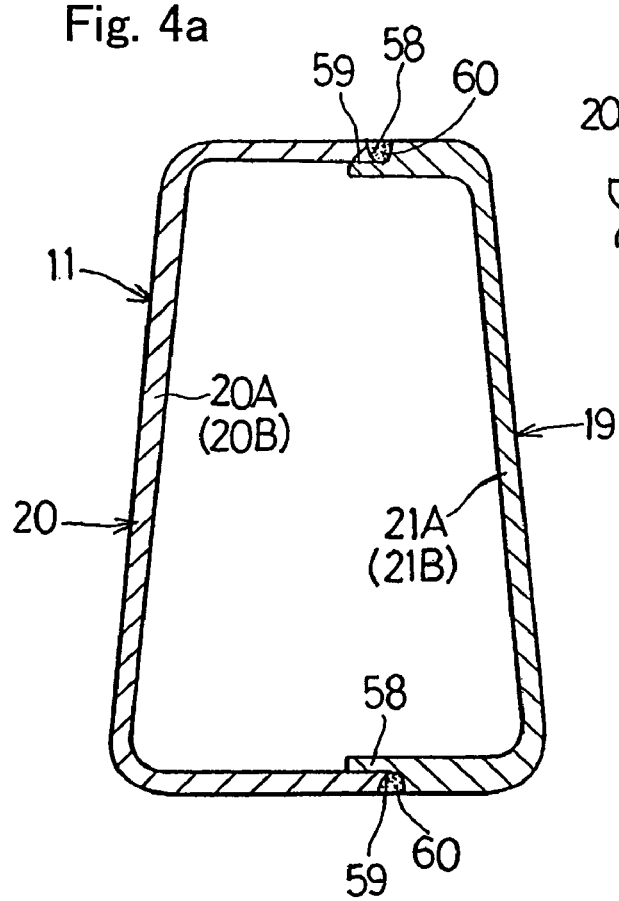
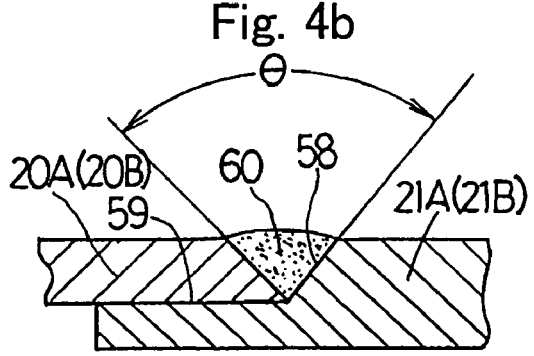
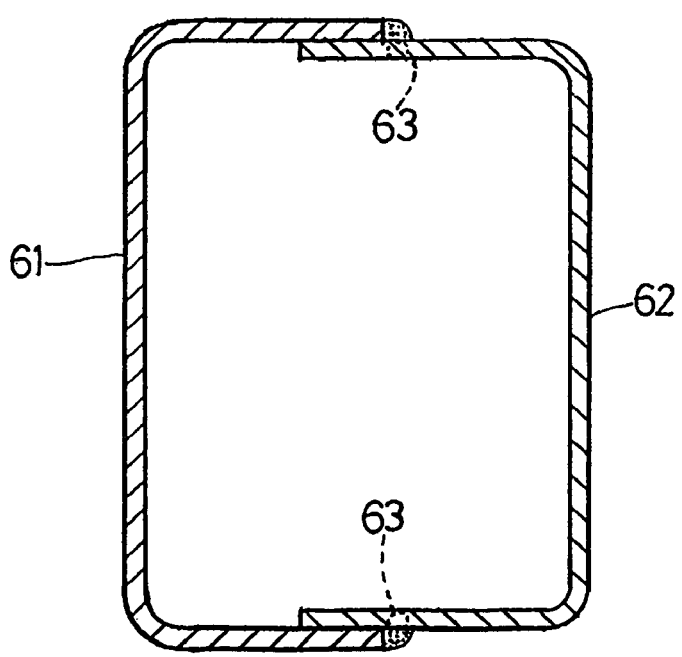

VEHICLE BODY FRAME OF MOTORCYCLES

FIELD OF THE INVENTION

The present invention relates to a vehicle frame structure for a motorcycle, which includes main frames prepared from a sheet metal and a cast metal.

BACKGROUND ART

For a well-known vehicle frame structure of a motorcycle, the Japanese Patent No. 2688916 discloses a vehicle frame structure which includes a pair of left and right main frame pieces each having inner and outer plates prepared from a sheet metal and also includes rear arm brackets (swing arm brackets) connected to and extending downwardly from a corresponding rear end of the main frame pieces and having left and right bracket bodies prepared from a cast metal, the left and right bracket bodies being connected with each other by means of cross tubes.

However, since in this known vehicle frame structure the inner and outer plates forming the pair of the left and right main frame pieces are each prepared from a sheet metal, it is difficult to secure dimensional accuracy. Because of this, where an air cleaner is desired to be disposed inside the main frame pieces forming a forked main frame, it is necessary to set a clearance for the mounting of the air cleaner and other components with a dimensional error taken into consideration. As a result, the main frame tends to become bulky in size, resulting in a weight increase.

Also, as shown in FIG. 4c, when an outer plate 61 and an inner plate 62 forming the main frame and prepared from a sheet metal are welded together, the outer and inner plates are overlapped one above the other and then connected together by a fillet welding. Accordingly, in view of the facts that the shape of a welding groove is limited and that it is difficult to position the outer and inner plates 61 and 62, both of which are prepared from a sheet metal and are therefore difficult to be prepared with dimensional accuracy, so as to be overlapped one above the other with no gap formed between the outer and inner plates 61 and 62, the welding workability tends to be lowered. Also, since respective portions in contact with welding joints between the outer and inner plates 61 and 62, which are encompassed by the phantom circles 63 in FIG. 4c, tends to be melted during the fillet welding, a welding torch must be set and held relative to the plate surface at an angle effective to accomplish an optimum welding and, therefore, not only does the welding require time-consuming and cumbersome procedures, but it also requires the skill. In addition, since the welding joint has a step at which the cross-sectional area varies greatly, stress concentration tends to set up easily.

Since the main frame is prepared by welding the outer frame 61 and the inner frame 62, each prepared from the sheet metal, finished products are apt to have large dimensional variations. Accordingly, when the air cleaner is to be disposed in a space inside the main frame, a joint of an air guide port inside the main frame and a joint of the air cleaner will not be smoothly positioned relative to each other, resulting in complicated and time-consuming assemblage.

Yet, when the strength of the main frame prepared from the sheet metal is desired to be locally reinforced, the main frame in its entirety has to be prepared to have an increased thickness and/or a separate element such as a gusset plate must be welded to the area required to be reinforced, resulting in increase of the weight and the manufacturing cost.

DISCLOSURE OF THE INVENTION

The present invention has been devised in view of the foregoing problems and is intended to provide a vehicle frame structure for a motorcycle having an appealing appearance, which structure can be assembled lightweight and compact in size and at a reduced cost.

In order to accomplish the foregoing object, the vehicle frame structure for a motorcycle according to the present invention includes a head block including a head tube, a main frame forked leftwards and rightwards from the head block to form a pair of left and right main frame half portions extending rearwardly of the head block, and swing arm brackets extending downwardly from rear ends of the main frame half portions. An inner frame portion of the main frame and the swing arm brackets in their entirety or inner portions of the swing arm brackets are integrally formed by an inner member prepared from a metal casting. On the other hand, at least an outer frame portion of the main frame is formed by an outer member prepared from a sheet metal.

In this vehicle frame structure for a motorcycle, since the outer portion of the main frame is formed by the outer member prepared from a sheet metal, not only can an excellent appearance be obtained as compared with a metal casting, but a weight reduction can also be achieved. On the other hand, since the inner portion of the main frame is formed by the inner member prepared from a metal casting that can be manufactured to have an accurate shape with higher dimensional precision than that afforded by a sheet metal, the following advantages can be obtained. Specifically, since the clearance for component parts such as an air cleaner that are to be disposed inside the forked main frame can be set to a value as small as possible, the widthwise dimension of the main frame can be reduced to facilitate compactization and reduction in the weight of the main frame. Also, when the outer member and the inner member are welded with each other, a welding step can be integrally formed in the inner member prepared from a metal casting, with each of tip portions of the inner member formed as a thin-walled portion and, accordingly, if the outer member prepared from a sheet metal is overlapped with this thin-walled portion so as to be butted against the welding step to perform a butt welding, positioning at the welding site can be accomplished easily and a favorable welding can be carried out. Also, since the shape of a welding groove between the inner member and the outer member, that is, the shape of a weld joint can have the freedom, the weldability can be increased to facilitate the efficient welding. In other words, the time required to accomplish the welding can be shortened.

Moreover, when the butt welding is performed, since a smooth weld joint without accompanying a bead protrusion can be obtained and, also, since the cross-sectional area of the resultant weld is uniform without being accompanied by any stress concentration, strength variations of the main frame can be withheld at a low level and, as a result, the weight of the main frame can be reduced. Also, since the inner member prepared from a metal casting and forming the inner portion of the main frame can be easily formed integrally with holding elements for an air cleaner and/or an electrical component and damping ribs if necessary, as compared with the conventional arrangement in which separate and independent retainer brackets are welded or bolted to a main frame or in which a damping structure having a rubber damper embedded in a main frame is employed, the number of component parts can be reduced to thereby reduce the cost. In addition, where the strength of the main frame is desired to be locally enhanced, it can be accomplished merely by increasing the thickness of that portion of the inner member, formed by casting, which requires reinforcement.

In a preferred embodiment of the present invention, a guide passage for introduction of an air to an air cleaner of an engine is formed inside the main frame. According to this feature, since the inside of the main frame functions as a part of the air cleaner, a cleaner casing for the air cleaner can be formed compact in size. In such case, since the inner portion of the main frame with respect to the vehicle frame structure is formed by the inner member prepared from a metal casting and capable of being manufactured with higher dimensional accuracy than that afforded by a sheet metal, the guide passage and a front portion of the cleaner casing can be favorably connected with each other to enhance the assemblability when the air cleaner or the like is disposed inside the forked main frame.

The air cleaner may be positioned within a space delimited between a pair of left and right main frame half portions of the main frame. According to this feature, the space between the main frame half portions can be effectively utilized.

Also, the inner and outer frame portions of the main frame may be configured to represent a generally U-shape with their openings jointed with each other to define the guide passage therein. According to this feature, the space for the guide passage can be secured.

In another preferred embodiment of the present invention, a flashing plate is employed for deflecting the flow of the air to separate water contained in the air is disposed within the guide passage. According to this feature, even though the air introduced contains raindrops or the like, intrusion of those raindrops into a downstream portion of a cleaner element of the air cleaner can be avoided by the flashing plate. Also, since the flashing plate can be easily formed integrally with the inner member that is prepared from a metal casting, there is no increase in the number of component parts and the cost.

In a further preferred embodiment of the present invention, the head block is formed with an intake passage through which the air is sucked and supplied to the guide passage. According to this construction, the space available within the frame structure from the head block towards the main frame can be utilized effectively to allow the air to be efficiently supplied to the air cleaner.

Also, the inner member is preferably integrally cast with cross members for connecting the pair of the left and right main frame half portions with each other. According to this feature, the rigidity of the main frame can be increased.

In addition, the inner member can be integrally cast with damping ribs. According to this feature, vibration of the main frame can be suppressed.

BRIEF DESCRIPTION OF THE DRAWINGS

FIG. 3 is a side view showing the vehicle frame structure supporting an engine;

FIG. 4*a* is an enlarged cross-sectional view of the vehicle frame structure taken along the line IV-IV in FIG. 2;

FIG. 4*b* is a fragmentary enlarged view of FIG. 4*a*; and

FIG. 4*c* is a sectional view of the conventional vehicle frame structure, shown for comparison purpose, showing the manner in which inner and outer plates of a main frame of the conventional vehicle frame structure are welded together.

BEST MODE FOR CARRYING OUT THE INVENTION

Hereinafter, a preferred embodiment of the present invention will be described in detail with reference to the accompanying drawings.

Figure 1:
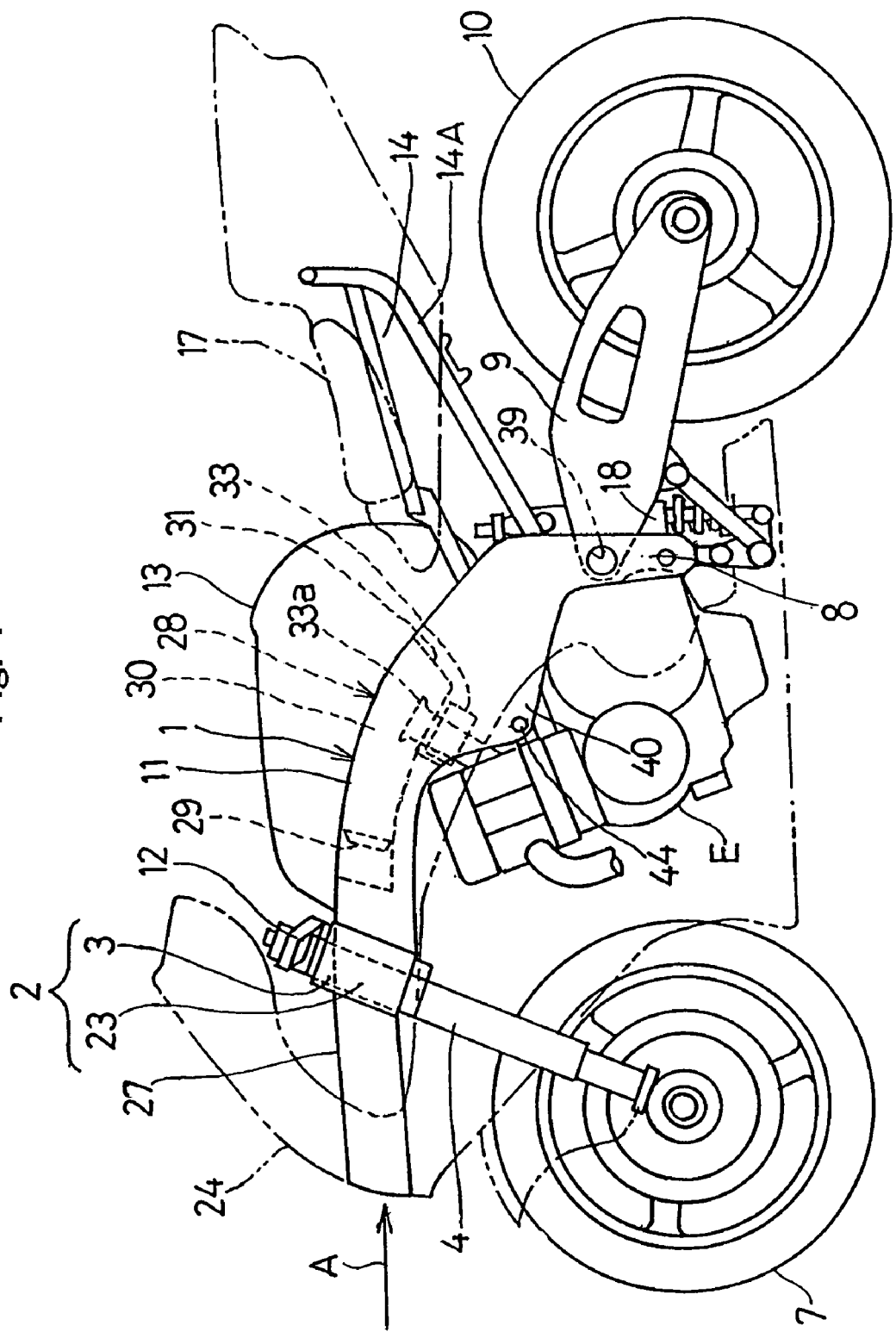
FIG. 1 is a side view of a motorcycle having a vehicle frame structure according to a preferred embodiment of the present invention.

FIG. 1 is a side view of a motorcycle having a vehicle frame structure according to a preferred embodiment of the present invention. The motorcycle includes a vehicle frame structure 1 and a front fork 4. The vehicle frame structure 1 has a head tube 3 formed integrally with a head block 2 at a front end of the vehicle frame structure 1 and also has swing arm brackets 8 positioned below a generally intermediate portion of the vehicle frame structure 1 to pivotally support a swing arm 9 for movement up and down with a rear wheel 10 rotatably carried by the swing arm 9. The front fork 4 is rotatably supported by the head tube 3 through a steering shaft (not shown) with a front wheel 7 rotatably carried by the front fork 4. An internal combustion engine E is mounted on the vehicle frame structure 1 at a location below a generally intermediate portion thereof and is used to drive the rear wheel 10 by a chain (not shown) while the motorcycle can be steered through the steering shaft and a handlebar 12 fixed on an upper end of the front fork 4. A fuel tank 13 is mounted on the top of main frames 11 of the vehicle frame structure 1.

A seat rail 14 and a reinforcement rail 14A cooperating together to define a rear portion of the vehicle frame structure 1 are secured to a rear portion of the main frame 11, with a seat 17 for supporting a motorcyclist mounted on the seat rail 17. A single rear suspension 18 is interposed between the vehicle frame structure 1 and the swing arm 9.

Figure 2:
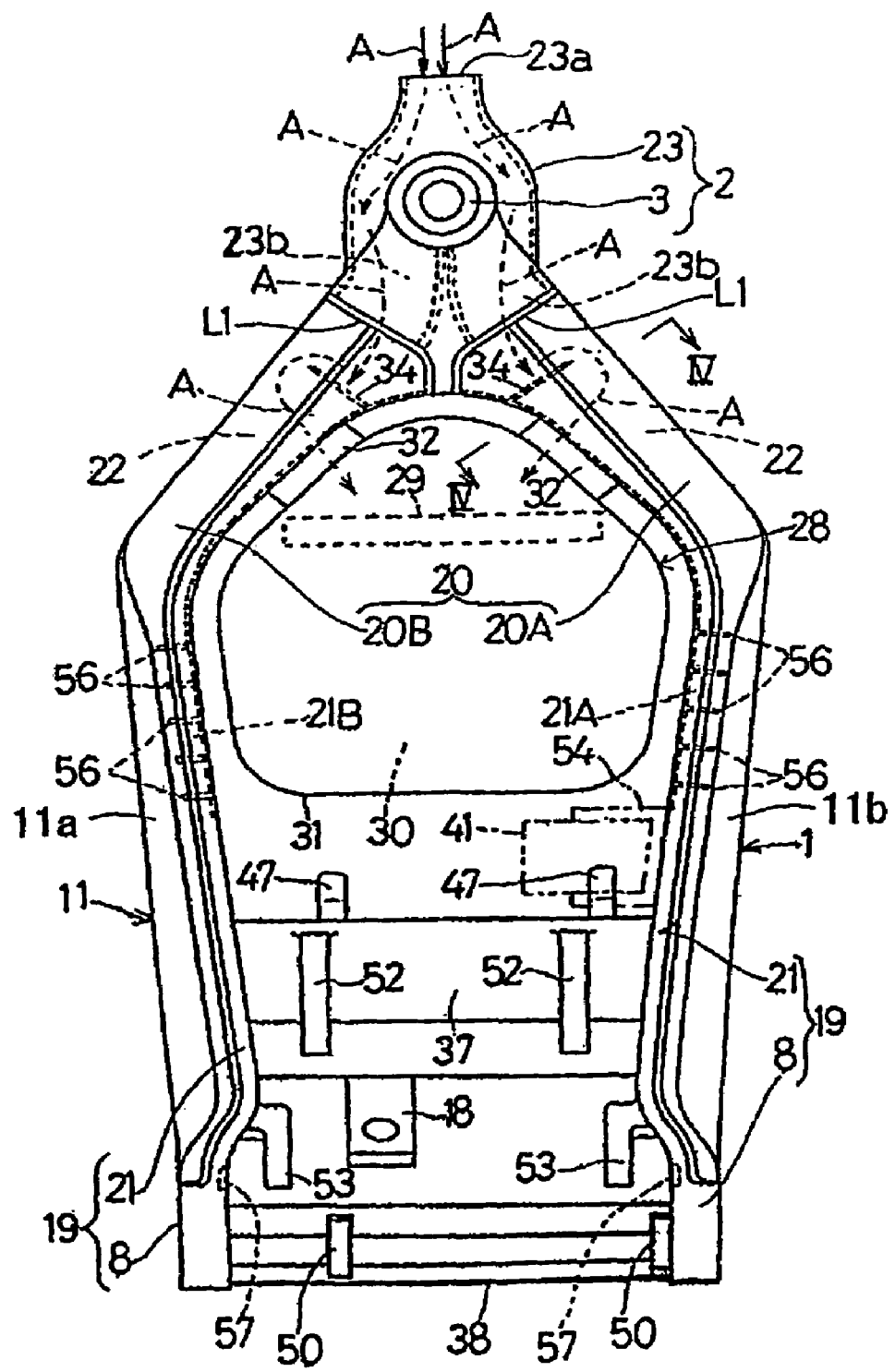
FIG. 2 is a view of the vehicle frame structure as viewed in a direction II shown in FIG. 3.

FIG. 2 illustrates the vehicle frame structure 1 as viewed in a direction II shown in FIG. 3. The illustrated vehicle frame structure 1 includes the main frame 11 forked from the head block 2 so as to extend rearwardly (or downwardly as viewed in FIG. 2) therefrom on left and right sides, respectively, to form a pair of left and right main frame half portions 11*a* and 11*b*, and also includes the swing arm brackets 8 that extend downwardly from left and right rear ends of the main frame 11, respectively, as shown in FIG. 3. The main frame 11 includes, as shown in FIG. 2, an inner member 19, prepared from a cast metal, and an outer member 20 prepared from a sheet metal and joined to the inner member 19. The inner member 19 includes an inner frame portion 21, made up of a pair of left and right inner frame halves 21A and 21B that are positioned inside the vehicle frame structure, and the swing arm brackets 8, the inner frame portion 21 and the swing arm brackets 8 being integrated together by a metal casting technique. The outer member 20 includes a pair of left and right outer frame halves 20A and 20B that are prepared from a sheet metal and define an outer frame portion of the main frame 11 of the vehicle frame structure 1.

FIG. 4*a* illustrates an enlarged cross-sectional view taken along line IV-IV in FIG. 2. As shown therein, the pair of the left and right outer frame halves 20A and 20B of the outer member 20 and the pair of the left and right inner frame halves 21A and 21B of the inner frame portion 21 of the inner member 19 are each in the form of U-sectioned configuration. The pair of the left and right outer frame halves 20A and 20B and the pair of the left and right inner frame halves 21A and 21B are welded together at their respective openings to define the main frame 11. A guide passage 22 for an air A (FIG. 1) forming a part of an upstream side of an air cleaner 28 is defined inside the pair of the left and right main frame half portions 11a and 11b. It is to be noted that the details of the route of flow of the air A and the welding of the outer frame halves 20A and 20B and the inner frame halves 21A and 21B will be described later.

The route of flow of the air A will now be described. Referring to FIG. 2, the head block 2 is a metal casting product made up of an air intake duct 23 having its front end opening outwardly and the head tube 3, both of which are molded integrally with each other, with a rear end of the air intake duct 23 welded to a front end of the main frame 11. The welding line is indicated by a symbol L1. Accordingly, the air A introduced into intake passages 23b through an intake port 23a at the front end of the intake duct 23 is introduced being branched into left and right introducing passages 22 in the main frames 11. Also, as shown in FIGS. 1 and 2, the front end of the intake duct 23 is fluid-connected with an air introducing duct 27 opening at a front surface of a front fairlng 24 of the motorcycle, and the air A is thus introduced from this air introducing duct 27 into the intake duct 23.

Within an inner space of the forked main frame 11 shown in FIG. 2, that is, an inner space between the two main frame half portions 11a and 11b, a cleaner casing 31 accommodating therein an cleaner element 29 forming a part of the air cleaner 28 is disposed, and an upstream side of the cleaner element 29 within the cleaner casing 31 is coupled in fluid-communication with the left and right introducing passages 22 in the main frame 11 through a pair of left and right connecting ducts 32. The cleaner casing 31 is supported by a throttle body 25 shown in FIG. 3.

As shown in FIGS. 1 and 2, the cleaner casing 31 is connected with a plurality of ducts 33a of fuel supply devices 33 that are connected with respective cylinders of the multi-cylinder engine E. Accordingly, the air A after having been branched and flowed from the air introducing duct 27, shown in FIG. 1, into the left and right introducing passages 22 in the main frames 11 and the connecting ducts 32 through the intake passages 23b of the air intake duct 23 is supplied to the cleaner casing 31 and is then purified by the cleaner element 29. The purified air is supplied from a purified air chamber 30 at a downstream side of the cleaner element 29 to the fuel supply device 33 through the ducts 33a and is finally supplied to the engine E after having been mixed with a fuel in the fuel supply devices 33.

In the vehicle frame structure 1, since the introducing passages 22 in the main frame 11 functions as a part of the air cleaner 28 to carry out, for example, noise reduction as a silencer and waterproofing, the cleaner casing 31 of the air cleaner 28 can be compact in size. In such case, since the inner space of the main frame 11 is defined by the inner member 19 prepared by the metal casting capable which enables to provide the inner member 19 with higher dimensional accuracy than the sheet metal, a consistent connection between the introducing passage 22 and the front portion of the air cleaner 28 can be achieved through the connecting duct 32 and the assemblability can be increased when the air cleaner 28 is disposed within the inner space of the forked main frame 11. Also, since the intake passages 23b are defined in the air intake duct 23 of the head block 2, the space available from the head block 2 towards the main frame 11 can be effectively utilized to allow the air A to be efficiently supplied to the air cleaner 28.

Also, in this embodiment, a flashing plate 34 for deflecting the flow of the air A over 270° to separate water contained in the air A is positioned within each of the left and right introducing passages 22 of the main frame 11 at a location upstream of the mounting site of the connecting duct 32. This flashing plate 34 is formed integrally with each of the left and right inner frame halves 21A and 21B of the inner frame portion 21 by a metal casting technique. Accordingly, even though the air A introduced contains raindrops or the like, intrusion of those raindrops into the air cleaner 28 can be avoided by the flashing plates 34. Also, since each of the flashing plates 34 can be easily formed integrally with the inner frame portion 21 prepared from a metal casting, there is no increase in the number of component parts used and the cost will not be increased.

The inner frame halves 21A and 21B forming the inner portions of the main frame half portions 11a and 11b and the left and right swing arm brackets 8 and 8 are connected with each other by respective cross members 37 and 38 extending left and right therebetween and formed integrally with the inner member 19 by a metal casting technique. Accordingly, the rigidity of the main frame 11 can be increased. The front upper cross member 37 is positioned rearwardly of the cleaner casing 31. Accordingly, the space for accommodating the cleaner casing 31 is delimited by the left and right main frame half portions 11a and 11b and the upper cross member 37. As shown in FIG. 3, at a location substantially intermediate of the vertical direction of the cross members 37 and 38, fitting holes 39 are defined in the swing arm brackets 8 to bear the swing arm 9 shown in FIG. 1.

A pair of left and right first engine mounts 40 for supporting an upper portion of the engine E are formed integrally with the main frame 11 so as to protrude downwardly therefrom. On the other hand, a portion of the cylinder of the engine E confronting each of the first engine mounts 40 is formed integrally with a fitting piece 43 so as to protrude therefrom. The first engine mounts 40 and the fitting pieces 43 are overlapped one above the other with spacers (not shown) intervening therebetween and, by fastening bolts 44, inserted into respective fitting holes of the first engine mounts 40 and the fitting pieces 43, with nuts (not shown), the engine E is supported at its front upper portion by the main frames 11.

Also, a pair of left and right second engine mounts 47 for supporting a rear upper portion of the engine E are formed integrally with the upper cross member 37 in the main frame 11 so as to protrude forwardly therefrom. On the other hand, a portion of a crankcase 48 of the engine E confronting each of the second engine mounts 47 is formed integrally with a fitting piece 49 so as to protrude therefrom. The second engine mounts 47 and the fitting pieces 49 are overlapped one above the other with their fitting holes (not shown) aligned and, by fastening bolts 44A, inserted into the fitting holes, with nuts (nut shown), the engine E is supported at its rear upper portion by the main frames 11.

In addition, a pair of left and right third engine mounts 50 for supporting a lower portion of the engine E are formed integrally with the lower cross member 38 in the swing arm brackets 8 so as to protrude upwardly therefrom. On the other hand, another portion of the crankcase 48 of the engine E confronting each of the third engine mounts 50 is formed with a screw hole (not shown). Yet, the swing arm brackets 8 are formed with respective throughholes 51 for a bolt fastening work. Thus, by aligning the fitting holes (not shown) in the third engine mounts 50 and the screw holes in the engine E with each other and then inserting fitting bolts 44B into the screw holes through the throughholes 51, the engine E is supported at its lower portion by the swing arm brackets 8.

Since the first to third engine mounts 40, 47 and 50 are formed integrally with the inner member 19, as compared with the conventional arrangement in which the engine is mounted through engine mounts which are formed by separate and independent elements, the number of component parts can be reduced and the assemblability can be increased. In addition, the engine E can be stably supported by the first to third engine mounts 40, 47 and 50 that are formed integrally with the inner member 19 prepared from a metal casting and thus having a high rigidity.

It is to be noted that the inner member 19 of a metal casting can be formed integrally with other members than the first to third engine mounts 40, 47 and 50. In the illustrated embodiment, in order for the seat rail 14 and the reinforcement member 14A shown in FIG. 1 to be fitted, a pair of left and right support pieces 52 and a pair of left and right support pieces 53 shown in FIG. 2 are formed integrally with the upper cross member 37 and inner surfaces of the swing arm brackets 8, respectively. Also, a plurality of damping ribs 56 are formed integrally with an inner surface of each of the left and right inner plate halves 21A and 21B of the inner member 19. Where the damping ribs 56 are provided integrally, as compared with the conventional damping structure in which rubber dampers are embedded within a main frame, the number of component parts can be reduced to achieve reduction in cost. Yet, the inner member 19 can be provided integrally with, for example, a mounting bracket 54 for holding an electrical component 41 as shown by the double-dotted line in FIG. 2. In addition, as shown in FIG. 3, a rear end portion of each of the inner frame halves 21A and 21B of the inner frame portions 21 is provided with a drain port 57 opening inwardly for discharging a water component, trapped by the flashing plate 34 (FIG. 2), to the outside of the vehicle frame structure 1.

In the next place, the welding between the outer frame halves 20A and 20B of the outer member 20 and the inner frame halves 21A and 21B of the inner member 19 will be described with reference to FIG. 4b which illustrates an important portion of FIG. 4a on an enlarged scale. Upper and lower end portions of each of the inner frame halves 21A and 21B of the inner members 19 of a metal casting are formed with welding steps 58 each corresponding to the thickness of each of the outer frame halves 20A and 20B of the outer member 20, with their tip portions defining a thin-walled portion 59. Opposite end portions of each of the outer frame halves 20A and 20B of the outer member 20 of a sheet metal are overlapped over the corresponding thin-walled portions 59 and a butt welding 60 is carried out while the opposite end portions of each of the outer frame halves 20A and 20B butt against the associated welding steps 58.

The employment of the above described welding method is effective to facilitate an accurate positioning of the outer frame halves 20A and 20B and the inner frame halves 21A and 21B relative to each other at the site of welding and is also effective to provide a high degree of freedom on the shape of the grooves between the inner frame halves 21A and 21B and the outer frame halves 20A and 20B. Accordingly, the weldability can be considerably increased and no high welding skill is needed to achieve the intended welding. In addition, where a butt welding is performed, if a suitable groove angle θ is selected, a mere linear movement of a welding torch while it is held at right angles to the welding groove is effective to secure penetration of an equal depth in both the outer frame halves 20A and 20B and the inner frame halves 21A and 21B so that smooth weld joints 60 without accompanying a bead protrusion can be obtained. Also, since the cross-sectional area of the resultant weld is uniform enough to prevent any stress concentration, the margin of the frame structure strength with respect to the weld joints 60 can be withheld at a low level. As a result, the weight of the main frame 11 can be reduced.

Also, since the inside of the main frame 11 is delimited by the outer member 20 of a sheet metal, the vehicle frame structure 1 can provide an appealing appearance. In addition, since the inside of the main frame 11 is constructed of the inner member 19 of a metal casting that can exhibit higher dimensional accuracy than a sheet metal, the clearance for the cleaner casing 31 or other components positioned inside the forked main frame 11 can be minimized to a value as small as possible and, accordingly, the widthwise dimension of the main frame 11 can be reduced to facilitate reduction in size and weight.

It is to be noted that although in the foregoing embodiment the inner frame portion 21 of the inner member 19 has been described as comprised of the pair of left and right inner frame halves 21A and 21B, the inner member 19 may be of a structure including an inner frame portion having left and right inner frame halves formed integrally and swing arm brackets. Also, although in the foregoing embodiment the outer member 20 has been shown as forming an outer frame portion of the main frame 11, the outer member 20 may form respective outer portions of the main frame 11 and the swing arm brackets 8. In such case, the inner member 19 will form the inner portions of the swing arm brackets 8.

What is claimed is:

1. A vehicle frame structure for a motorcycle, which comprises: a head block including a head tube;
   a main frame welded to the head block and forked leftwards and rightwards from the head block including a pair of left and right inner frame halves positioned inside the vehicle frame structure and a pair of left and right outer frame halves positioned outside the vehicle frame structure; and
   swing arm brackets extending downwardly from rear ends of the main frame;
   wherein the inner and outer frame halves of the main frame are respectively configured to have generally U-shaped sections, with their openings welded to each other to form the main frame,
   wherein the inner frame halves of the main frame and the swing arm brackets, in their entirety or respective inner portions of the swing arm brackets, are made of a unitary cast metal,
   wherein at least the outer frame halves of the main frame are made of a sheet metal, and wherein a guide passage for introduction of air to an air cleaner of an engine is formed inside the main frame.

2. The vehicle frame structure for the motorcycle as claimed in claim 1, wherein the air cleaner is positioned within a space delimited between the pair of left and right inner frame halves of the main frame.

3. The vehicle frame structure for the motorcycle as claimed in claim 1, wherein a flashing plate for deflecting a flow of the air, to separate water contained in the air, is disposed within the guide passage.

4. The vehicle frame structure for the motorcycle as claimed in claim 1, wherein the head block is formed with an intake passage through which the air is sucked and supplied to the guide passage.

5. The vehicle frame structure for the motorcycle as claimed in claim 4, wherein the head block is a metal casting including an air intake duct that defines the intake passage and the head tube, and is welded to the main frame.

6. The vehicle frame structure for the motorcycle as claimed in claim 1, wherein the pair of left and right inner frame halves are integrally cast with a cross member for connecting the pair of left and right inner frame halves with each other.

7. The vehicle frame structure for the motorcycle as claimed in claim 1, wherein the inner frame halves are integrally cast with damping ribs.

* * * * *